(12) United States Patent
Shiino et al.

(10) Patent No.: US 6,845,610 B2
(45) Date of Patent: Jan. 25, 2005

(54) EXHAUST GAS PURIFICATION APPARATUS AND METHOD

(75) Inventors: Toshikazu Shiino, Kanagawa-ken (JP); Takashi Aoyama, Kanagawa-ken (JP); Hirofumi Tsuchida, Kanagawa-ken (JP); Isamu Hotta, Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 446 days.

(21) Appl. No.: 09/985,553

(22) Filed: Nov. 5, 2001

(65) Prior Publication Data

US 2002/0062641 A1 May 30, 2002

(30) Foreign Application Priority Data

Nov. 30, 2000  (JP) ..................................... P2000-365234

(51) Int. Cl.$^7$ ................................................. F01N 3/00
(52) U.S. Cl. ............................. 60/286; 60/274; 60/295; 60/301
(58) Field of Search .......................... 60/286, 276, 301, 60/303, 295

(56) References Cited

U.S. PATENT DOCUMENTS

| | | | | |
|---|---|---|---|---|
| 3,986,350 A | * | 10/1976 | Schmidt | 60/274 |
| 5,201,802 A | * | 4/1993 | Hirota et al. | 60/276 |
| 5,272,871 A | * | 12/1993 | Oshima et al. | 60/274 |
| 5,412,946 A | * | 5/1995 | Oshima et al. | 60/276 |
| 5,522,218 A | * | 6/1996 | Lane et al. | 60/274 |
| 5,586,433 A | * | 12/1996 | Boegner et al. | 60/274 |
| 5,809,774 A | * | 9/1998 | Peter-Hoblyn et al. | 60/274 |
| 5,894,728 A | * | 4/1999 | Wakamoto | 60/286 |
| 5,921,076 A | | 7/1999 | Krutzsch | |
| 6,176,078 B1 | * | 1/2001 | Balko et al. | 60/274 |
| 6,260,353 B1 | * | 7/2001 | Takahashi | 60/286 |
| 6,324,834 B1 | * | 12/2001 | Schnaibel et al. | 60/274 |
| 6,363,716 B1 | * | 4/2002 | Balko et al. | 60/274 |

FOREIGN PATENT DOCUMENTS

| | | |
|---|---|---|
| EP | 0 537 968 A1 | 4/1993 |
| EP | 1 094 206 A2 | 4/2001 |
| JP | 06-117224 * | 4/1994 |
| JP | 06-137138 * | 5/1994 |
| WO | WO 99/04145 A1 | 1/1999 |

OTHER PUBLICATIONS

DATABASE WPI, *Section Ch, Week 199829*, 1998, Derwent Publications Ltd., London, GB, XP002220569.
Patent Abstracts of Japan, vol. 012, No. 292, Aug. 10, 1988 & JP 63 068714 A, Mar. 28, 1988.
"Exhaust–Gas Reforming of Hydrocarbon Fuels," by Jones et al., SAE Paper 931096 (1993), pp. 223–233.

* cited by examiner

*Primary Examiner*—Thomas Denion
*Assistant Examiner*—Diem Tran
(74) *Attorney, Agent, or Firm*—Foley & Lardner LLP (57) ABSTRACT

An exhaust gas purification apparatus and method is applied to an internal combustion engine. The internal combustion engine generates an exhaust gas to be introduced to an exhaust system thereof. There is provided a reformer and controller. The reformer introduces a fuel and a part of the exhaust gas and generates a reformed gas including at least hydrogen and the controller is programmed to control a fuel supply amount of the fuel introduced to the reformer and an exhaust gas introduction amount of the exhaust gas introduced to the reformer in accordance with a demanded hydrogen amount of the reformer and operating conditions of the internal combustion engine. The exhaust gas is purified while controlling the fuel supply amount and the exhaust gas introduction amount.

13 Claims, 8 Drawing Sheets

FIG.8A  (1) LOW TEMPERATURE, SMALL A/F

FIG.8B  (2) HIGH TEMPERATURE, SMALL A/F

FIG.8C  (3) HIGH TEMPERATURE, LARGE A/F

EXHAUST GAS PURIFICATION APPARATUS AND METHOD

BACKGROUND OF THE INVENTION

The present invention relates to an exhaust gas purification apparatus and method and, more particularly, to an exhaust gas purification apparatus and method purifying exhaust gases exhausted from an internal combustion engine.

As shown in FIG. 1 of SAE Paper 931096, it has been proposed to provide an exhaust gas purification apparatus having a reformer arranged to introduce a fuel and a part of exhaust gases of an internal combustion engine for reforming the same. The reformer is so constructed as to perform partial oxidation and steam reforming by using oxygen and water contained in the exhaust gases to generate a reformed gas containing hydrogen from a hydrocarbon fuel. The reformed gas has various applications such as a fuel for the internal combustion engine or a part of the fuel thereof, a reducing agent to be introduced into an exhaust system or a fuel for a combustor type heating device represented with a burner.

SUMMARY OF THE INVENTION

However, in the use of such a reformer, various situations are encountered below in detail.

First, it is required for the reformer to be operated so as to satisfy a demanded flow amount of the reformed gas which is determined according to intended purposes of the reformed gas and operating conditions of the internal combustion engine. This is due to the fact that a lack of the demanded flow amount of the reformed gas is reflected with a reduction in an effect obtained by the reformed gas whereas the presence of an excessive flow amount of the reformed gas is reflected in a waste of energy consumed by the reformer. Also, even with the provision of an accumulating tank that temporarily stores an excess amount of the reformed gas, the accumulating tank is required to have an increased volume in order to supply the reformed gas without shortage at all times, causing a difficulty in a design layout of the exhaust gas purification apparatus to be incorporated in a vehicle.

Beside, it is considered that the temperature of the exhaust gases and the oxygen and moisture concentrations thereof may vary according to the operating conditions of the internal combustion engine, a variation in the operating performance of the reformer, a fluctuation in the amount of reformed gas and the hydrogen concentration. This results in a remarkable increase in the amount of fuel to generate the reformed gas at a given flow amount, causing an increased fuel consumption and fluctuation in the amount of the reformed gas to encounter a shortage in the amount of the reformed gas.

The present invention has been made in view of the above studies and has an object to provide an exhaust gas purification apparatus and method which are able to operate a reformer at a high operating performance in accordance with operating conditions of an internal combustion engine so as to generate a reformed gas at a flow amount to satisfy a demanded amount of the reformed gas.

According to one aspect of the present invention, there is provided an exhaust gas purification apparatus of an internal combustion engine. The internal combustion engine generates an exhaust gas to be introduced to an exhaust system thereof. The exhaust gas purification apparatus comprises: a reformer introducing a fuel and a part of the exhaust gas and generating a reformed gas including at least hydrogen; and a controller programmed to control a fuel supply amount of the fuel introduced to the reformer and an exhaust gas introduction amount of the exhaust gas introduced to the reformer in accordance with a demanded hydrogen amount of the reformer and operating conditions of the internal combustion engine. The exhaust gas is purified while controlling the fuel supply amount and the exhaust gas introduction amount.

In other words, in the present invention, an exhaust gas purification apparatus of such an internal combustion engine comprises: reforming means for generating a reformed gas including at least hydrogen by introducing a fuel and a part of the exhaust gas; and controlling means for controlling a fuel supply amount of the fuel introduced to the reforming means and an exhaust gas introduction amount of the exhaust gas introduced to the reforming means in accordance with a demanded hydrogen amount of the reforming means and operating conditions of the internal combustion engine. The exhaust gas is purified, while controlling the fuel supply amount and the exhaust gas introduction amount.

Besides, in the present invention, an exhaust gas purification method of such an internal combustion engine generates a reformed gas including at least hydrogen by introducing a fuel and a part of the exhaust gas, and controls a fuel supply amount of the fuel introduced when the reformed gas is generated and an exhaust gas introduction amount of the exhaust gas introduced when the reformed gas is generated in accordance with a demanded hydrogen amount demanded when the reformed gas is generated and operating conditions of the internal combustion engine. The exhaust gas is purified, while controlling the fuel supply amount and the exhaust gas introduction amount.

Other and further features, advantages, and benefits of the present invention will become more apparent from the following description taken in conjunction with the following drawings.

DETAILED DESCRIPTION OF THE PREFERRED EMBODIMENTS

To describe the present invention more in detail, an exhaust gas purification apparatus of several embodiments of the present invention to implement a method for purifying exhaust gases will be explained with reference to the accompanied drawings below.

Figure 1:
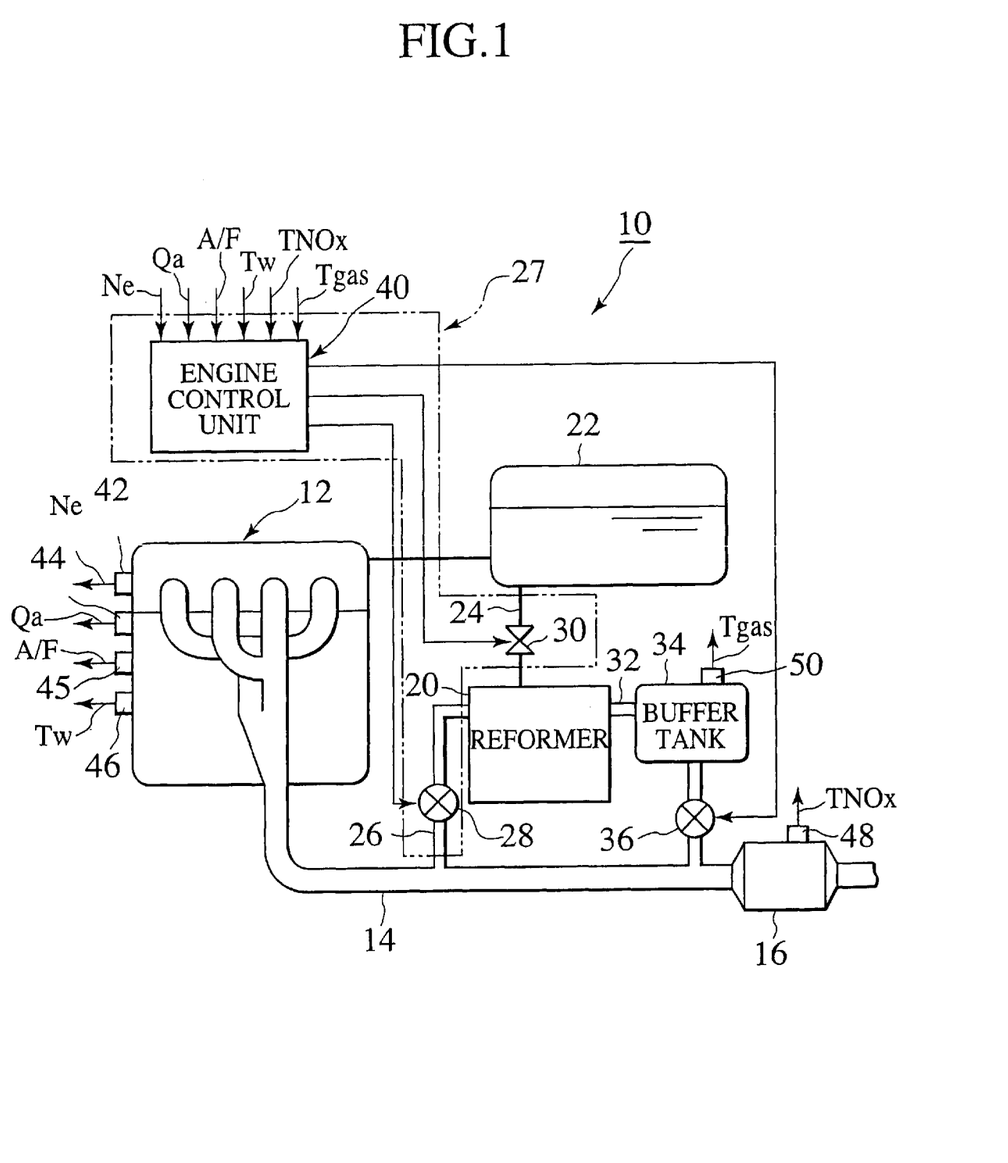
FIG. 1 is a schematic structural view of an exhaust gas purification apparatus of one embodiment according to the present invention.

Referring to FIG. 1, there is shown an exhaust gas purification apparatus of an internal combustion engine (hereinafter referred to as an engine) of one embodiment according to the present invention. The exhaust gas purification apparatus, generally designated at 10, is used for purifying exhaust gases to be expelled to the atmosphere through an exhaust gas pipe 14, extending from an exhaust manifold of an engine 12, and a NOx trap catalyst device 16 located in the exhaust pipe 14 and serving as an exhaust gas purification device to trap NOx compounds. To this end, the exhaust gas purification apparatus 10 includes a reformer 20 which is supplied with a fuel and exhaust gases from a fuel tank 22 and the exhaust pipe 14 via a fuel supply conduit 24 and an exhaust gas supply branch conduit 26, respectively.

The fuel tank 22 normally stores a hydrocarbon fuel such as gasoline or diesel fuel, which is also supplied to the engine 12 for propelling the same. The hydrocarbon fuel is mixed with air to provide an air/fuel mixture which is combusted in the engine 12 to produce a drive power output, with the exhaust gases being discharged to the atmosphere through the exhaust pipe 14 and the NOx trap catalyst device 16.

The reformer 20 reforms fuel and exhaust gases into a reformed gas containing at least hydrogen which is used for reducing NOx compounds contained in the exhaust gases to thereby purify exhaust gases in the NOx trap catalyst device 16 in a manner as will be described below in detail.

In order to operate the reformer 20 at the maximum operating performance, the exhaust gas purification apparatus 10 further includes a regulating section 27 composed of an exhaust gas flow control valve 28 and a fuel flow control valve 30, which are located in the branch conduit 26 and the fuel supply conduit 24, respectively, and an engine control unit 40.

The exhaust gas flow control valve 28 is so constructed as to control the flow amount (introduction amount) of a part of the exhaust gases to be introduced into the reformer 20 in accordance with operating conditions of the engine 12 or the like in a manner as will be discussed below in detail and serves as an exhaust gas introduction amount adjustment means. Likewise, the fuel flow control valve 30 is so constructed as to control the flow amount (supply amount) of fuel to be partly introduced into the reformer 20 in accordance with the operating conditions of the engine 12 or the like in a manner as will be discussed below in detail and serves as a fuel supply amount adjustment means.

The reformed gas generated by the reformer 20 is fed through a reformed gas flow passage 32 into a buffer tank 34, from which a part of the reformed is fed through a reformed gas supply control valve 36 to the exhaust pipe 14 at a position downstream of a junction between the exhaust pipe 14 and the branch conduit 26, i.e. to an upstream side of the NOx trap catalyst device 16. The buffer tank 34 has a structure to temporarily accumulate the reformed gas in a given volume and serves as a reformed gas accumulation means.

The NOx trap catalyst device 16 is connected to the exhaust pipe 14 at a position downstream of a junction between the exhaust pipe 14 and the reformed gas flow passage 32. The NOx trap catalyst device 16 is so constructed as to trap NOx compounds when an air/exhaust ratio remains in a lean side and to discharge the trapped NOx compounds for thereby purify the exhaust gases when an air/exhaust ratio remains in a theoretical air/exhaust ratio (stoichiometry) or in a rich side. Introduction of the reformed gas through the reformed gas supply control valve 36 into the NOx trap catalyst device 16 effectuates the reduction of the NOx compounds trapped in the NOx trap catalyst device 16 as controlled one.

With such a structure discussed above, the reformer 20 is operated at the maximum performance by controlling the flow amounts of fuel and exhaust gases to be introduced into the reformer 20 and the flow amount of the reformed gas to be introduced into the NOx trap catalyst device 16, at desired values in dependence on operation state information of the engine 12.

In order to achieve this end, the engine control unit 40 is programmed to control the exhaust gas flow control valve 28, the fuel flow control valve 30 and the reformed gas supply control valve 36 in dependence on engine operation state information.

In particular, the engine control unit 40 is connected to an engine speed sensor 42, an intake air amount sensor 44, an air/fuel ratio sensor 45, a cooling water temperature sensor 46, a trapped NOx amount sensor 48 and an accumulated reformed gas amount sensor 50 to receive an engine speed Ne, an intake air amount Qa, an air/fuel ratio A/F, a cooling water temperature Tw, a trapped NOx amount TNOx and an accumulated reformed gas amount Tgas from the above sensors, respectively, as engine operating parameters representing engine operation state information. The sensors 42, 44, 45 and 46 are attached to the engine 12, and the sensor 48 is attached to the NOx trap catalyst device 16 while the sensor 50 is attached to the buffer tank 34.

The engine control unit 40 is programmed to be responsive to various engine operating parameters, which represent engine operation state information, to control an operation of the engine 12 and to control operations of the exhaust gas flow control valve 28, the fuel flow control valve 30 and the reformed gas supply control valve 36. The engine control unit 40 thus programmed controls the control valves 28, 30 and 36 according to calculated results of desired target flow amounts, with respective calculation methods being exemplified in control block diagrams shown in FIGS. 2A and 2B.

Figure 2A:
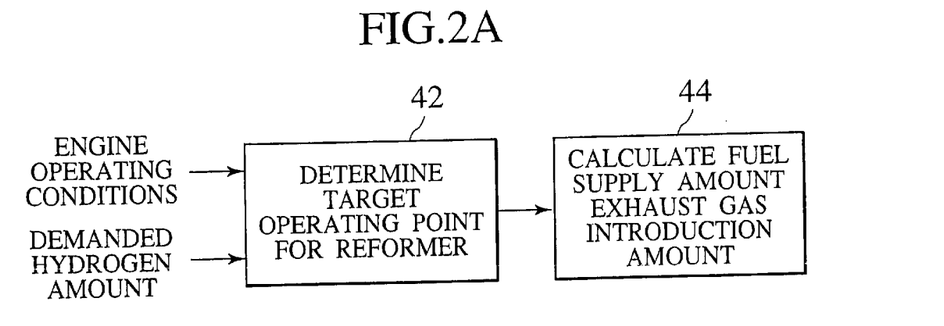
FIGS. 2A and 2B are block diagrams illustrating control routines for the exhaust gas purification apparatus shown in FIG. 1.

FIG. 2A is a block diagram illustrating how the fuel supply amount and the exhaust gas introduction amount are calculated to achieve control of the fuel flow control valve 30 and the exhaust gas flow control valve 28, respectively. As shown in FIG. 2A, input parameters including operation state information of the engine 12 and a demanded hydrogen amount of the reformer 20 are applied to the engine control unit 40, which determines a target operating point for the reformer 20 in response to these input signals as indicated by the block 42. Further, the engine control unit 40 calculates the fuel supply amount and the exhaust gas introduction amount for the reformer 20 on the basis of the target operating point for the reformer 20 as indicated by the block 44.

Figure 2B:
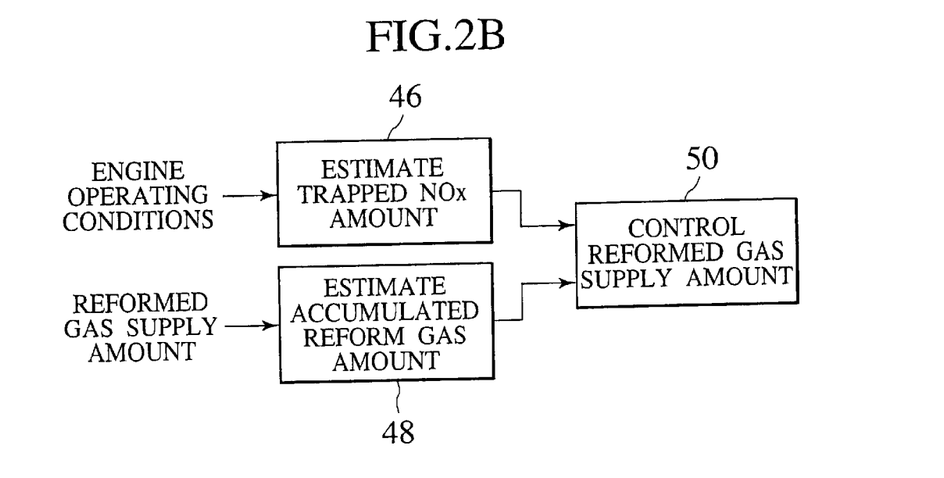

FIG. 2B is a block diagram illustrating how the reformed gas supply amount is controlled by using the reformed gas supply control valve 36. As shown in FIG. 2B, input parameters including operation state information of the engine 12 and the reformed gas supply amount of the reformer 20 are applied to the engine control unit 40, which estimates a NOx trap rate, which is obtained by the NOx trap catalyst device 16, as indicted by the block 46 and the accumulated reformed gas amount of the buffer tank 34 in response to these input parameters as shown by the block 48. Further, the engine control unit 40 is responsive to the estimated values of the trapped NOx amount and the accumulated reformed gas amount for controlling the reformed gas supply amount through the reformed gas supply control valve 36 as indicated by the block 50.

Figure 3:
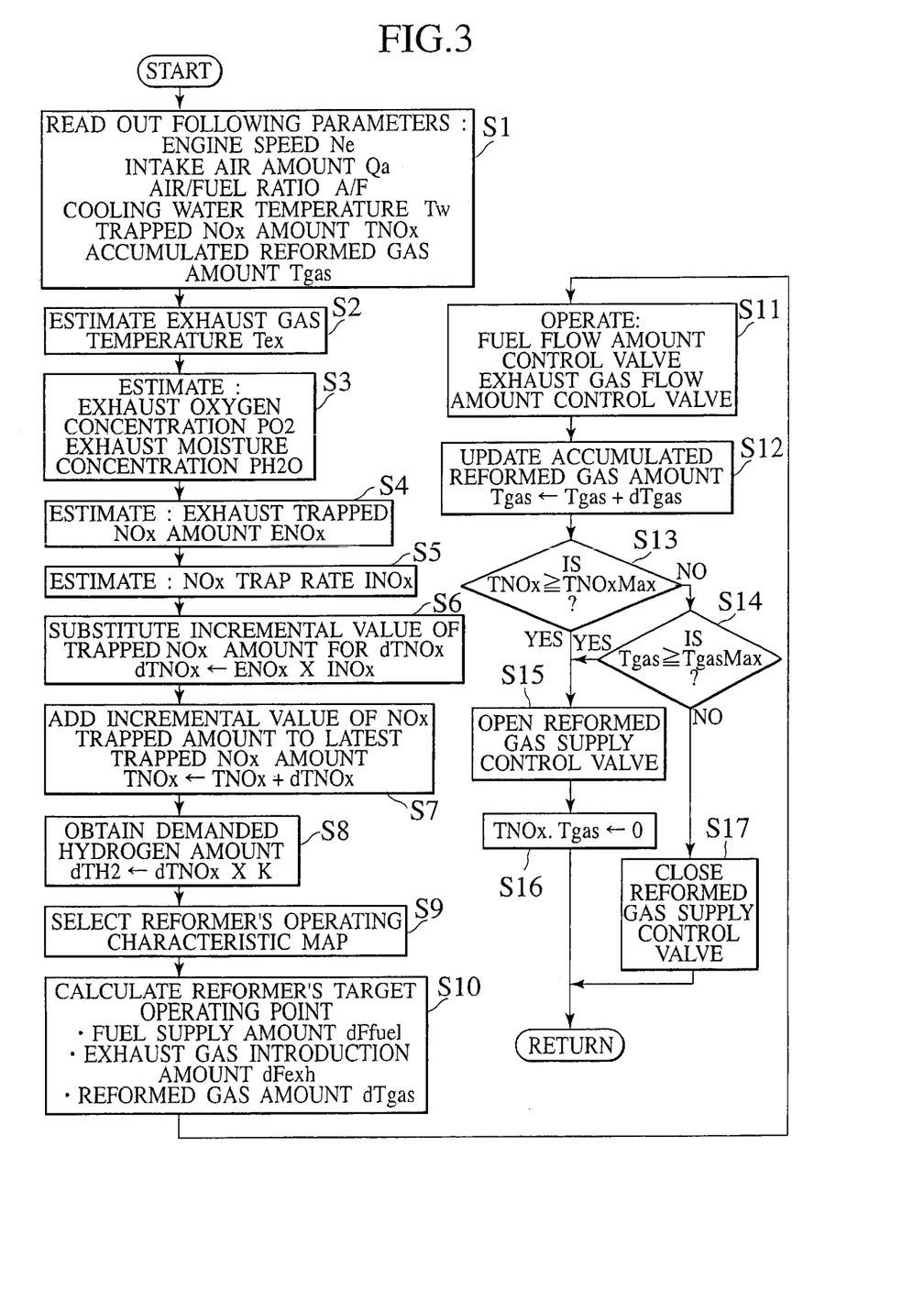
FIG. 3 is a flow chart illustrating the basic sequence of operational steps for the exhaust gas purification apparatus shown in FIG. 1 to carry out a method of the present invention.

FIG. 3 is a flow chart illustrating the basic sequence of operational steps of a control routine, which is repetitively executed for every given time period by a microcomputer of the engine control unit 40 in accordance with a program, for the exhaust gas purification apparatus to carry out an exhaust gas purification method according to the present invention.

First in step S1, the microcomputer of the engine control unit 40 reads out the engine operating parameters involving the engine speed Ne, the intake air amount Qa, the air/fuel ratio A/F and the cooling water temperature Tw. Additionally, the microcomputer reads out the latest trapped NOx amount TNOx and the latest accumulated reformed gas amount Tgas which have been calculated by and stored in the latest control routine.

Figure 4A:
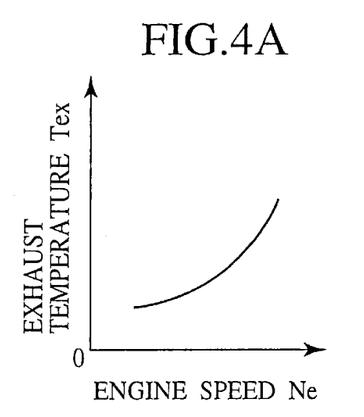
FIGS. 4A to 4D are graphs illustrating characteristics for estimating the temperature of exhaust gases plotted in terms of operating parameters of an internal combustion engine of the apparatus shown FIG. 1.
Figure 4B:
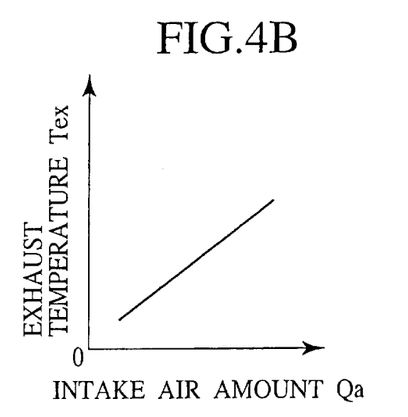
Figure 4C:
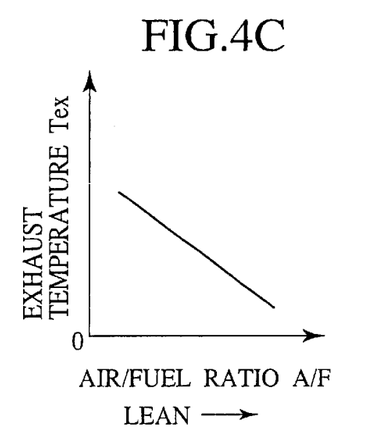
Figure 4D:
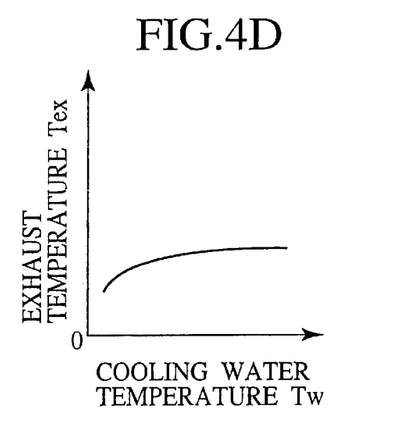

In step S2, the microcomputer estimates the exhaust gas temperature Tex in response to the engine operating parameters read out in step S1. In this connection, the engine operating parameters (Ne, Qa, A/F, Tw) and the exhaust gas temperature Tex have characteristic relationships shown in the graphs shown in FIGS. 4A to 4D. More particularly, the exhaust gas temperature Tex and the engine speed Ne have the operating characteristic as shown in FIG. 4A. Further, the exhaust gas temperature Tex and the intake air amount Qa have the operating characteristic as shown in FIG. 4B. Furthermore, the exhaust gas temperature Tex and the air/fuel ratio A/F have the operating characteristic as shown in FIG. 4C. Also, the exhaust gas temperature Tex and the cooling water temperature Tw have the operating characteristic as shown in FIG. 4D. These operating characteristics are processed to preliminarily form a matrix table or to form map data in the engine control unit 40 to allow the operating characteristics to be referred to according to the values of the engine operating parameters. It will thus be seen that the exhaust gas temperature is readily estimated. Alternatively, an exhaust gas temperature sensor may be used to detect the exhaust gas temperature Tex in a direct fashion.

Figure 5A:
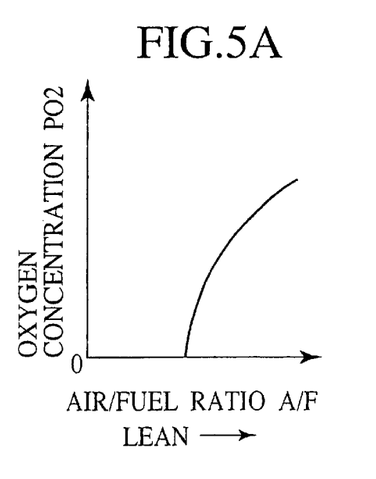
FIGS. 5A and 5B are graphs illustrating characteristics for estimating an oxygen concentration and a hydrogen concentration plotted in terms of the operating parameters of an internal combustion engine of the apparatus shown FIG. 1.
Figure 5B:
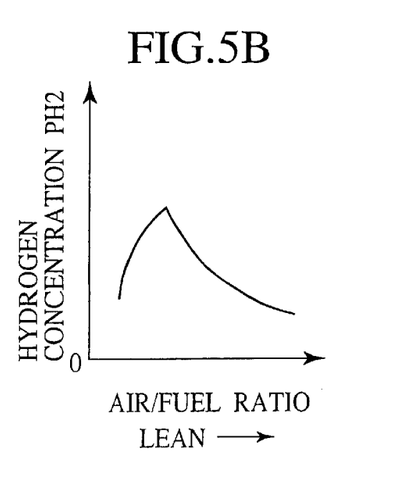

In step S3, the microcomputer estimates an exhaust oxygen concentration PO2 and an exhaust moisture concentration PH2O, contained in the exhaust gases, on the basis of the air/fuel ratio A/F. In this connection, the oxygen concentration degree PO2 and the water concentration PH2O have the characteristics varying in terms of the air/fuel ratio A/F as shown in FIGS. 5A and 5B. Therefore, the oxygen concentration PO2 and the moisture concentration PH2O can preferably be estimated from the air/fuel ratio A/F in the same technique as in step S2.

Figure 6A:
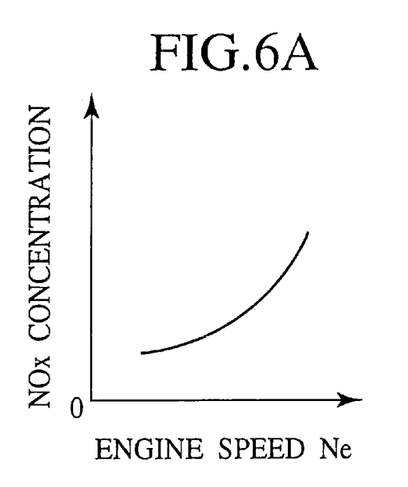
FIGS. 6A to 6D are graphs illustrating characteristics for estimating a NOx concentration plotted in terms of the operating parameters of an internal combustion engine of the apparatus shown FIG. 1.
Figure 6B:
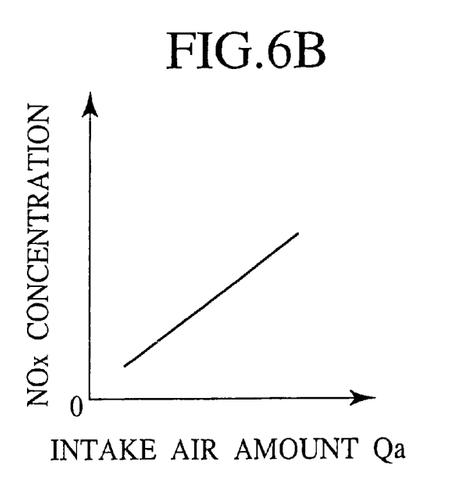
Figure 6C:
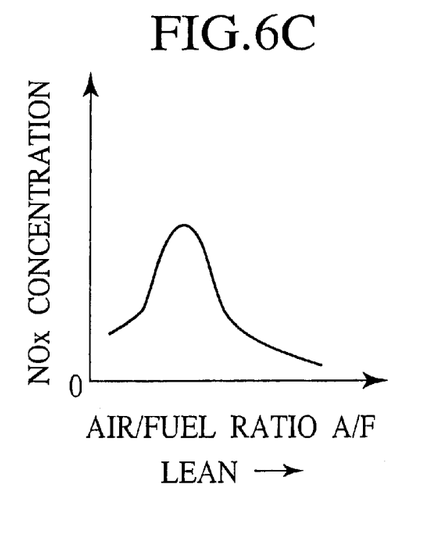
Figure 6D:
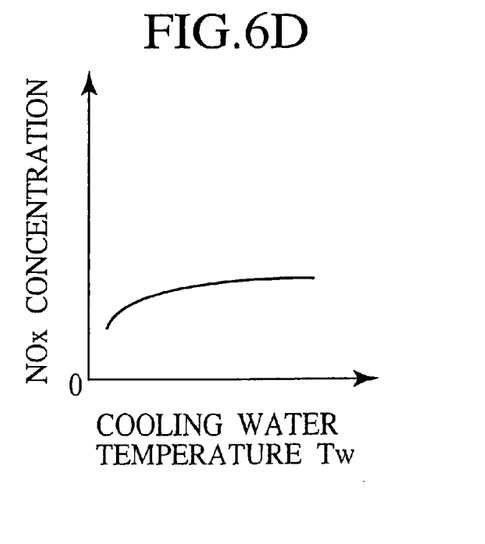

In step S4, the microcomputer estimates the amount ENOx of NOx content in the exhaust gases on the basis of the engine operating parameters (Ne, Qa, A/F, Tw). In this connection, the engine operating parameters (Ne, Qa, A/F, Tw) and the NOx concentration in the exhaust gases have characteristic relationships shown in the graphs shown in FIGS. 6A to 6D. More particularly, the NOx concentration and the engine speed Ne have the operating characteristic as shown in FIG. 6A. Further, the NOx concentration and the intake air amount Qa have the operating characteristic as shown in FIG. 6B. Furthermore, the NOx concentration and the air/fuel ratio A/F have the operating characteristic as shown in FIG. 6C. Also, the NOx concentration and the cooling water temperature Tw have the operating characteristic as shown in FIG. 6D. These operating characteristics are processed to estimate the NOx concentration in the same technique as steps S2 and S3, with the NOx concentration being multiplied with the amount of exhaust gases to obtain the amount ENOx of the NOx concentration. While, also, the amount of exhaust gases may be obtained by calculating the intake air flow amount Qa and the air/fuel ratio A/F, the intake air amount Qa per se may be employed for a convenience.

Figure 7A:
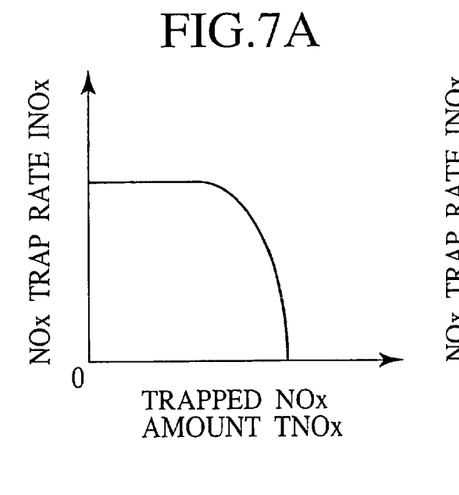
FIGS. 7A to 7C are graphs illustrating characteristics for estimating a NOx trap rate plotted in terms of the operating parameters of an internal combustion engine of the apparatus shown FIG. 1.
Figure 7B:
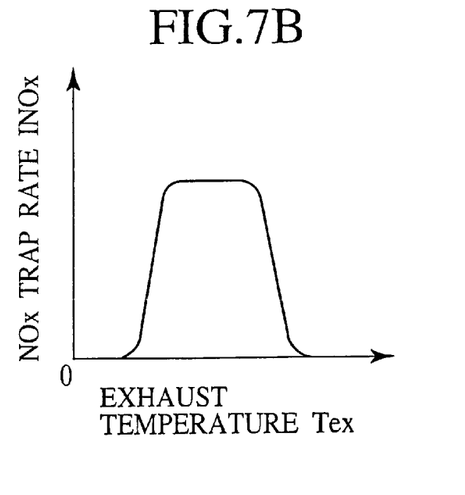
Figure 7C:
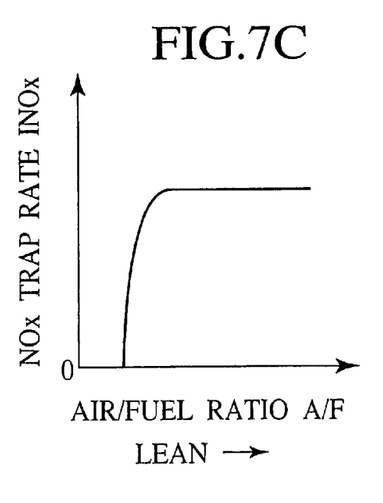

In step S5, the microcomputer estimates the trapped NOx rate INOx of the NOx trap catalyst device 16. The trapped NOx rate INOx represents the rate of the NOx trapped in the NOx trap catalyst device 16 and varies according to the operating conditions of the NOx trap catalyst device 16 and the exhaust gas components. Typical examples are plotted in the graphs shown in FIGS. 7A to 7C. In particular, the trapped NOx rate INOx varies in terms of the trapped NOx amount TNOX as shown by a curve in FIG. 7A. Further, the trapped NOx rate INOx varies in terms of the exhaust gas temperature Tex as plotted in a curve in FIG. 7B. Likewise, the trapped NOx rate INOx varies in terms of the air/fuel ratio A/F as shown in a curve in FIG. 7C. Thus, the trapped NOx rate INOx can be estimated from the trapped NOx amount TNOx, the exhaust gas temperature Tex and the air/fuel ratio A/F in the same techniques as those in steps S2 to S4. Also, it may be possible to mount a detector means on the NOx trap catalyst device 16 to directly detect the operating temperature thereof to allow the detected temperature to be used in place of the exhaust gas temperature Tex.

As to existing NOx amount ENOx in the exhaust gases, since the NOx amount to be trapped by the NOx trap catalyst device 16 is represented by a formula ENOx×INOx, in step S6, the microcomputer substitutes this factor for an increment value dTNOx (dTNOx←ENOx×INOx).

In step S7, due to NOx trapping operation of the NOx trap catalyst device 16, since the trapped NOx amount TNOx increases by the increment value dTNOx, the increment value dTNOx of the trapped NOx amount is added to the latest trapped NOx amount TNOx, thereby updating the trapped NOx amount TNOx (TNOx←TNOx+dTNOx). It is to be noted here that steps S6 and S7 serve as the trapped NOx amount estimating means.

In step S8, a demanded hydrogen amount dTH2, which represents the amount of hydrogen required for reduction of the incremental value dTNOx of the trapped NOx amount, is obtained as the product of the incremental value dTNOx of the trapped NOx amount and the coefficient K (dTH2=dTNOx×K). Thus, the step S8 serves as a calculation means for calculating the demanded hydrogen amount. Here, the symbol K refers to a hydrogen conversion value of NOx, i.e. the amount of hydrogen required for the reduction of the NOx per unit amount. Thus, step S8 makes it possible to prepare the hydrogen gas at all times necessary for reduction of the trapped NOx.

In step S9, a reformer operating characteristic map (i.e. a characteristic map of a hydrogen production amount in terms of the fuel supply amount and the exhaust gas introduction amount) is obtained from the exhaust gas temperature Tex and the air/fuel ratio A/F. Examples of the reformer operating characteristic maps are shown by graphs in FIGS. 8A to 8C wherein the fuel supply amounts are plotted in terms of the exhaust gas introduction amount and the reformed gas production amount in conjunction with the varying exhaust gas temperatures and the varying air/fuel ratios. As will be apparent from these graphs, since the reformer will operate under operating characteristics which are different from one another in dependence on the exhaust gas temperature Tex and the air/fuel ratio (i.e. the oxygen and water concentrations in the exhaust gases), in step S9, the microcomputer selects the operating characteristic maps different from one another according to the exhaust gas temperature Tex and the air/fuel ratio A/F.

Figure 8A:
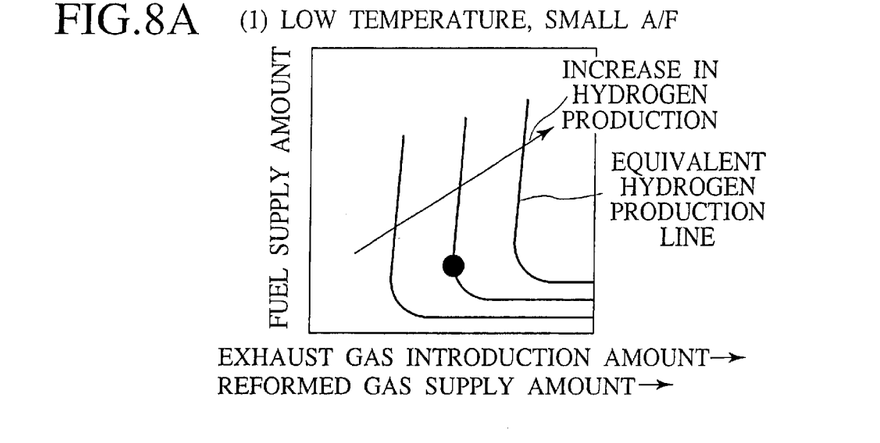
FIGS. 8A to 8C are graphs illustrating reformer's operating characteristics and examples for determining operating points in the exhaust gas purification apparatus shown in FIG. 1.
Figure 8B:
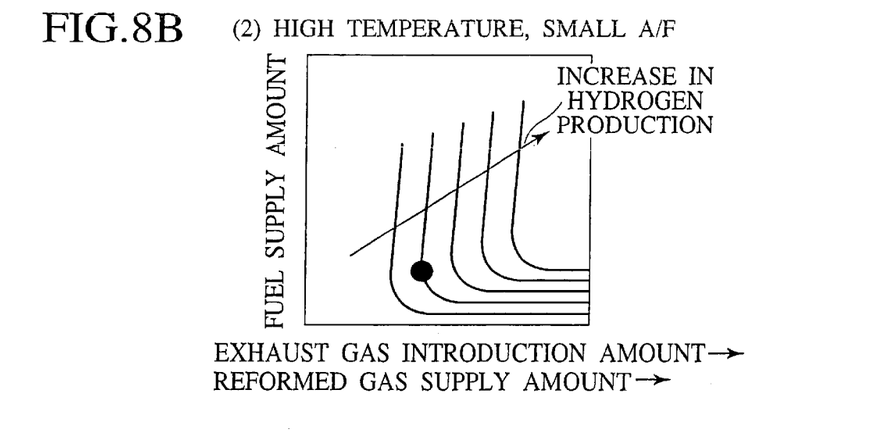
Figure 8C:
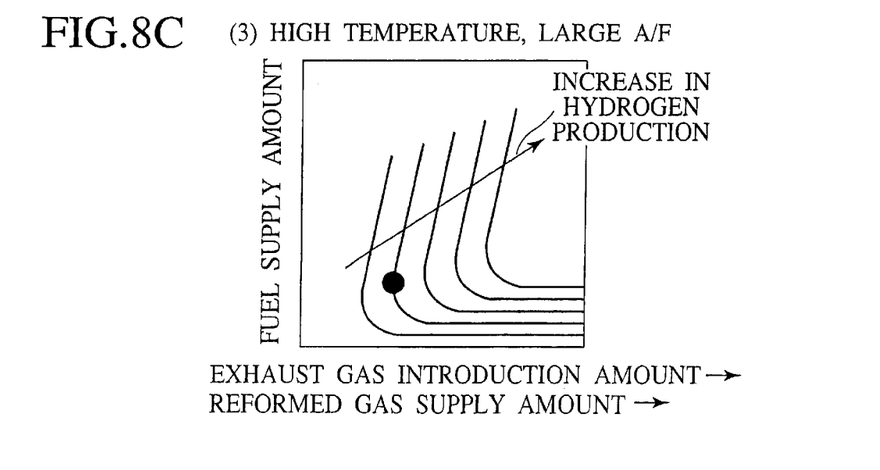

Among the examples of the operating characteristic maps shown in FIGS. 8A to 8C, the operating characteristic map of FIG. 8A is selected in a case when the exhaust gas temperature Tex remains at a low level and the air/fuel ratio A/F remains at a low level. The operating characteristic map of FIG. 8B is selected under a condition where the exhaust gas temperature Tex remain at a high level and the air/fuel ratio A/F remains at the low level. The operating characteristic map of FIG. 8C is selected under a condition where the exhaust gas temperature Tex remain at a high level and the air/fuel ratio A/F remains at a high level. In an alternative technology, such operating characteristic maps, which serve as base references, respectively, may be corrected according to the above factors, thereby extracting corrected operating characteristic maps corresponding to these factors. Also, the temperature detector means may be provided to detect the temperature of the reformer to generate a temperature detection signal, which is used in place of the exhaust gas temperature Tex when obtaining the operating characteristic maps. Further, in stead of employing the air/fuel ratio A/F, it may be possible for the operating characteristic maps to be obtained by using the oxygen concentration PO2 and the moisture concentration PH2O of the exhaust gases.

In step S10, the microcomputer determines the reformer's target operating point, i.e. the fuel supply amount dFfuel and the exhaust gas introduction amount dFexh, from the demanded hydrogen production amount dTH2 obtained in step S8, on the basis of the reformer operating characteristic maps obtained in step S9.

As seen from the reformer's operating characteristic maps shown in FIGS. 8A to 8C, although there are large number of combinations the fuel supply amount and the exhaust gas introduction amount appearing on an equivalent hydrogen production line in order to obtain a production of a certain amount of hydrogen, it is preferable to operate the engine at a low volume of fuel supply amount in view of minimizing fuel consumption. Also, it is preferable for the exhaust gas introduction amount (i.e. the volume of the reformed gas) to be maintained at a lower value to minimize the volume of the buffer tank 34 in view of an overall layout of the exhaust gas purification apparatus to be mounted on a vehicle.

As a consequence, in step S10, desired points, which satisfy the above factors, are obtained on the equivalent hydrogen production line representing the demanded hydrogen amount dTH2. FIGS. 8A to 8C show various graphs illustrating determined examples of the target operating points (i.e. the fuel supply amount dFfuel and the exhaust gas introduction amount dFexh) of the reformer in a case where given demanded hydrogen amount dTH2 under various operating conditions. Also, when determination for the target operating points has been completed, a current reformed gas amount dTgas is obtained from the operating characteristic maps.

In step S11, the fuel flow control valve 30 and the exhaust gas flow control valve 28 are driven in response to the determined results (the fuel supply amount dFfuel and the exhaust gas introduction amount dFexh) obtained in step S10, thereby allowing the fuel and the exhaust gases to be supplied to the reformer 20 at respective controlled flow amounts. Steps S9 to S11 are implemented with the fuel flow control valve 30 and the exhaust gas flow control valve 28 to serve with these components as a fuel supply amount regulating means and an exhaust gas introduction amount regulating means. Upon receipt of the fuel and exhaust gases, the reformer 30 generates the reformed gas which is temporarily accumulated in the buffer tank 34.

In step S12, the reformed gas amount dTgas which is currently generated is added to the latest accumulated reformed gas amount Tgas, thereby updating the accumulated reformed gas amount Tgas (Tgas←Tgas+dTgas). This step S12 serves as a reformed gas accumulation amount estimating means.

By the way, since there is a limit in the amount of NOx to be trapped in the NOx trap catalyst device 16 and, if the amount of NOx exceeds the trapping capacity, the NOx compounds are exhausted to a downstream side of the NOx trap catalyst device 16, it is desirable for the NOx trap catalyst device 16 to be removed from the vehicle body and to be cleaned up prior to an increase of the NOx amount to an upper limit.

To achieve this end, in step S13, the microcomputer discriminates whether the trapped NOx amount TNOx exceeds the upper limit TNOxMax or is below the same. Here, the upper limit TNOxMax is referred to the trapped NOx amount that provides a difficulty in obtaining a given NOx trap rate.

In case of "YES", the operation goes to step S15 for opening the reformed gas supply control valve 36 to allow the reformed gas in the buffer tank 34 to be supplied to the exhaust pipe 14 at the upstream side of the NOx catalyst device 16, thereby allowing the trapped NOx in the NOx trap catalyst device 16 to be reduced and purified with hydrogen contained in the reformed gas.

On the contrary, in case of "NO", the operation goes to step S14 to implement another discrimination step. Since the volume of the buffer tank 34 is limited and the reformed gas exceeding the limited volume can not be accumulated. While, also, it is desired for the volume of the buffer tank 34 to be determined according to the max NOx amount necessary for execute the reduction at one time, there might be some instances where the hydrogen concentration is brought into a low level depending on the engine operating conditions to cause the reformed gas to increase in an excessive volume.

To address this issue, in step S14, the microcomputer discriminates whether the buffer tank 34 remains in an overflow state or in a normal state, i.e. whether the reformed gas accumulation amount Tgas exceeds the given upper limit value TgasMax corresponding to the volume of the buffer tank 34 or is below the same.

In case of "YES", the operation goes to step S15 for opening the reformed gas supply control valve 36 to allow the reformed gas in the buffer tank 34 to be supplied to the exhaust pipe 14 at the upstream side of the NOx catalyst device 16, thereby allowing the trapped NOx in the NOx trap catalyst device 16 to be reduced and purified with hydrogen contained in the reformed gas in a manner as previously described.

On the contrary, in case of "NO", the operation goes to step S17 for rendering the reformed gas supply control valve 36 in a closed state, thereby completing the current routine. Here, steps S13 to S17 serve in combination with the reformed gas supply control valve 36 as a reformed gas supply control means.

Also, after opening the reformed gas supply control valve 36 in step S15 to discharge the reformed gas, the operation goes to step S16 for rendering the trapped NOx amount TNOx and the accumulated reformed gas amount Tgas to be cleared at "0", thereby completing the current routine.

Figure 9:
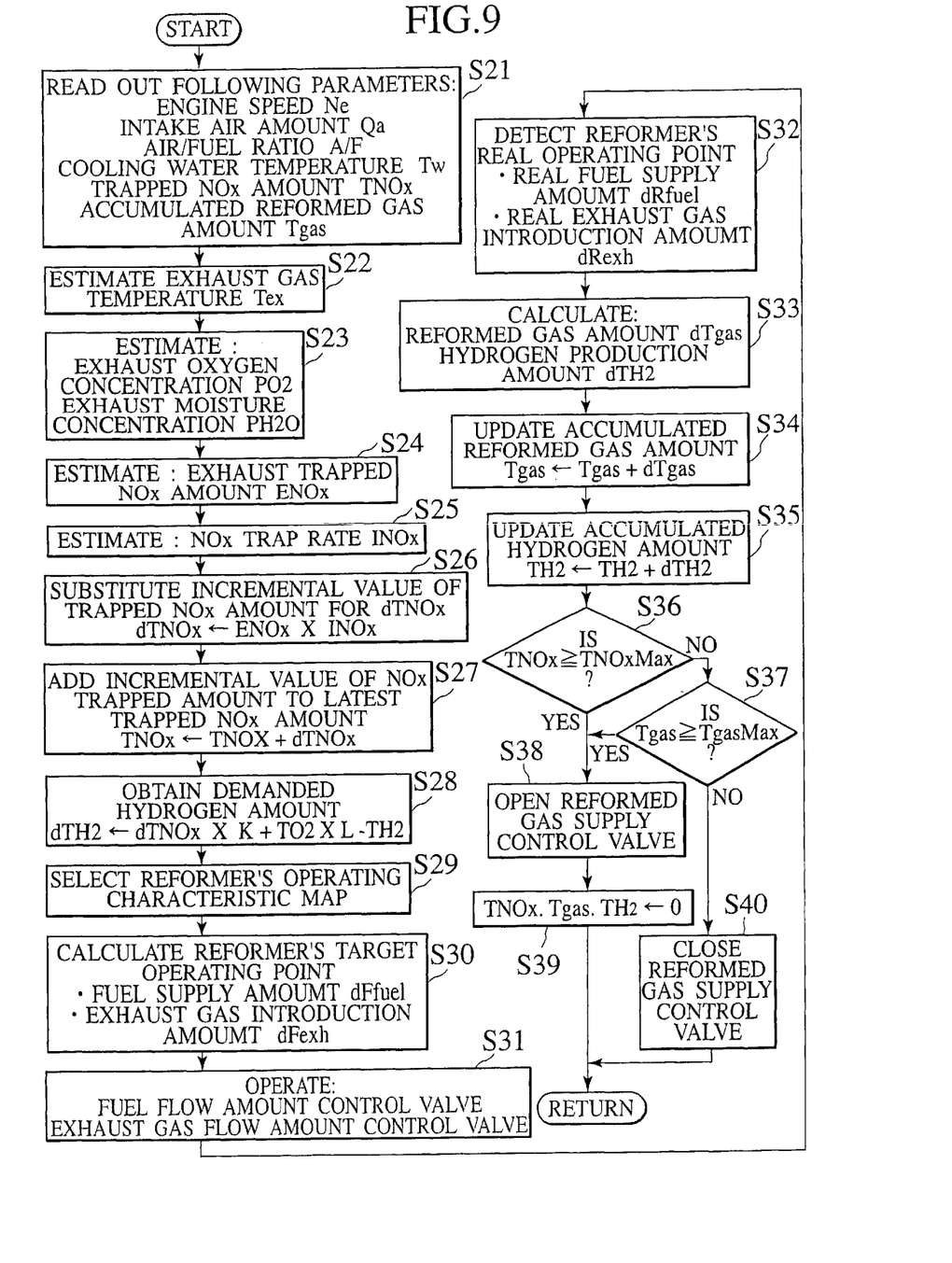
FIG. 9 is a flow chart illustrating the basic sequence of operational steps for an exhaust gas purification apparatus of another embodiment of the present invention to carry out a method of the present invention.

FIG. 9 is a flow chart illustrating the basic sequence of operation of a control routine of an exhaust gas purification apparatus of another embodiment of the present invention to carry out another method of the present invention, with like parts bearing the same reference numerals as those used in the apparatus of the embodiment shown in FIG. 1.

Steps S21 to S27 are identical with steps S1 to S7 and, therefore, a detailed description of these steps is herein omitted for the sake of simplicity. However, in step S21, the accumulated hydrogen amount TH2 of the buffer tank 34, which has been calculated and stored in the latest routine, is read out.

In step S28, the microcomputer calculates the demanded hydrogen amount dTH2 by adding the hydrogen amount of TNOx×K necessary for the reduction of the trapped NOx amount TNOx trapped in the NOx trap catalyst device 16 and the hydrogen amount of TO2×L to be consumed by the oxygen TO2 contained in the exhaust gases when supplying the reformed gas to the exhaust pipe 14 to obtain the sum and by subsequently subtracting the accumulated hydrogen amount TH2 of the buffer tank 34 from the sum (dTH2←TNOx×K+TO2×L−TH2). Step S28 serves as a demanded hydrogen amount calculation means. Also, it seems that the oxygen TO2 has a component such as oxygen contained in the exhaust gases and oxygen absorbed in a NOx trap catalyst of the device 16 and can be obtained on the basis of the air/fuel ratio A/F. The symbol L represents the hydrogen amount conversion value, i.e. the amount of hydrogen to be consumed by oxygen per unit amount. Step for obtaining the product of TO2×L corresponds to a consumed hydrogen estimating means. Upon consideration of the product of TO2×L in such a manner, it is possible to prevent the amount of hydrogen, required for reduction of the NOx compounds, from suffering a lack in volume.

Steps S29 to S31 are identical to steps S9 to S11 of FIG. 3 and, therefore, a detailed description of the same is omitted. However, in step S30, while the operation is executed to calculate the fuel supply amount dFfuel and the exhaust gas introduction amount dFexh to obtain the reformer's target operating point, calculation of the reformed gas amount dTgas is not implemented unlike step S10.

In step S32, the reformer's target operating point is obtained by detecting a real fuel supply amount dRFuel and a real exhaust gas introduction amount dRexh. In consecutive step S33, further, the microcomputer calculates the reformed gas amount dTgas and the hydrogen production amount dTH2 on the basis of the real fuel supply amount dRfuel and the real exhaust gas introduction amount dRexh. Even with these steps, if it is difficult to obtain the flow amount with a target value because of the engine operating conditions and the operating characteristics of the control valves, etc., it is possible to detect the actual operating point, thereby rendering it possible to accurately obtain the reformed gas amount dTgas and the hydrogen production amount dTH2.

Step S34 is identical with step S12 of FIG. 3 and a detailed description of the same is omitted.

In step S35, the microcomputer adds the hydrogen production amount dTH2 which is currently accumulated to the accumulated hydrogen TH2 of the buffer tank 34, thereby updating the accumulated hydrogen TH2 (TH2←TH2+dTH2). Step 35 corresponds to an accumulated hydrogen amount estimating means.

Subsequent steps S36 to S40 are identical as steps S13 to S17 and a detailed description of the same is herein omitted. However, in step S39, the reformed gas supply control valve 36 is opened to allow the reformed gas in the buffer tank 34 to be discharged and, thereafter, the trapped NOx amount TNOx, the accumulated reformed gas amount Tgas and the accumulated hydrogen gas amount TH2 are cleared to "0".

With such a structure of the present embodiment, even in a case where the reformer 20 can not perform the operation at an intended target, such a phenomenon can be effectively considered in the demanded hydrogen amount during subsequent computation of the various factors to provide a corrected value, for thereby minimizing the overshooting or undershooting phenomenon of the hydrogen production amount.

It will now be understood from the foregoing embodiments of the present invention, an important advantage of the exhaust gas purification apparatus and method of the present invention concerns a capability of regulating the fuel supply amount and the exhaust gas introduction amount in accordance with a demanded hydrogen amount and operating conditions of the internal combustion engine to allow the reformer to be operated at a maximum operating performance to enable supply of the reformed gas at the demanded flow amount.

Another important advantage of the exhaust gas purification apparatus and method of the present invention concerns the fuel flow control valve, the exhaust gas flow control valve and the control unit programmed to control the fuel flow control valve and the exhaust gas flow control valve in dependence on the demanded hydrogen amount and the operating conditions of the engine to enable a reliable operation of the reformer in a simplified structure.

Another important advantage of the exhaust gas purification apparatus and method of the present invention involves the use of the demanded hydrogen amount in combination with the temperature of the exhaust gases and the air/fuel ratio for regulating the fuel supply amount and the exhaust gas introduction amount to allow the reformer to be supplied with the fuel, the oxygen and the moisture at the flow amounts, necessary for the demanded hydrogen amount, in dependence on the various operating conditions of the engine.

Another important advantage of the exhaust gas purification apparatus and method of the present invention involves the capability of regulating the fuel supply amount such that the fuel supply amount is decreased to the substantially minimum value in terms of the demanded hydrogen amount, thereby enabling a decreased fuel consumption in the reformer to prevent deterioration in a fuel economy.

Another important advantage of the exhaust gas purification apparatus and method of the present invention involves the capability of regulating the amount of the reformed gas such that the amount of the reformed gas is decreased to the substantially minimum value in terms of the demanded hydrogen amount, i.e. to maximize the hydrogen concentration in the reformed gas. This allows the reformed gas to be generated at a high concentration with a decreased production amount, with a resultant decrease in the volume of the buffer tank that temporarily stores the reformed gas.

Another important advantage of the exhaust gas purification apparatus and method of the present invention concerns the exhaust gas purifying device composed of the NOx trap catalyst device connected to the exhaust pipe to allow the reformed gas to be introduced into the exhaust gases at the position upstream of the catalyst at the desired flow amount for thereby increasing the purification performance of the reformer.

Another important advantage of the exhaust gas purification apparatus and method of the present invention concerns the capability wherein the amount of NOx compounds trapped by the catalyst is estimated and the demanded hydrogen amount of the reformer is calculated on the basis of the estimated value of the amount of NOx compounds trapped by the catalyst for thereby enabling the reformer to generate the reformed gas containing the hydrogen with an amount required for the reduction of the NOx compounds.

Another important advantage of the exhaust gas purification apparatus and method of the present invention involves the capability of calculating the demanded hydrogen amount according to the varying value of the amount of NOx compounds trapped by the catalyst, allowing the reformed gas to be temporarily stored in the buffer tank to enable storage of the hydrogen in the amount necessary for the reduction of the NOx compounds trapped in the catalyst at all times even when supplying the reformed gas into the exhaust system.

Another important advantage of the exhaust gas purification apparatus and method of the present invention involves the capability of estimating the accumulated hydrogen gas amount of the reformed gas accumulation means to allow the demanded reformed gas amount to be calculated in dependence on the amount of NOx compounds trapped by the catalyst and the hydrogen accumulation amount of the reformed gas accumulation means, thereby enabling the demanded reformed gas to be suitably corrected on the basis of the trapped NOx compounds even in the presence of the difference between the demanded hydrogen amount required for the NOx reduction and the amount of the accumulated hydrogen.

Also, another important advantage of the exhaust gas purification apparatus and method of the present invention involves the capability of estimating the amount of hydrogen to be consumed by oxygen after supplying the reformed gas into the exhaust pipe and calculating the demanded hydrogen amount by adding the estimated amount of hydrogen to be consumed by the oxygen, thereby preventing a shortage of the amount of hydrogen required for the NOx reduction even when the hydrogen is consumed in reaction with the oxygen present in the exhaust gases.

Still also, another important advantage of the exhaust gas purification apparatus and method of the present invention involves the capability of temporarily accumulating the reformed gas, estimating the reformed gas accumulation amount of the reformed gas accumulation means, and controlling the supply of the reformed gas into the exhaust pipe in dependence on the amount of NOx compounds trapped by the catalyst and the reformed gas accumulation amount of the reformed gas accumulation means, enabling the reformed gas to be supplied prior to the presence of the amount of trapped NOx compounds and the reformed gas accumulation amount increasing to the respective upper limits for thereby preventing a deterioration in the purification of the exhaust gases and in the operating performance of the purification device.

The entire content of a Patent Application No. TOKUGAN 2000-365234 with a filing date of Nov. 30, 2000 in Japan is hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. An exhaust gas purification apparatus of an internal combustion engine, the internal combustion engine generating an exhaust gas to be introduced to an exhaust system thereof, comprising:

a reformer introducing a fuel and a part of the exhaust gas and reforming the fuel and the exhaust gas into a reformed gas containing at least hydrogen which is used for reducing NOx compounds contained in the exhaust gas; and a controller programmed to control a fuel supply amount of the fuel introduced to the reformer and an exhaust gas introduction amount of the exhaust gas introduced to the reformer in accordance with a demanded hydrogen amount of the reformer and an air/fuel ratio of the internal combustion engine, wherein the exhaust gas is purified while controlling the fuel supply amount and the exhaust gas introduction amount.

2. An exhaust gas purification apparatus according to claim 1, wherein the controller is programmed to control the fuel supply amount and the exhaust gas introduction amount in accordance with the demanded hydrogen amount, the air/fuel ratio and an exhaust gas temperature of the internal combustion engine.

3. An exhaust gas purification apparatus according to claim 2, further comprising:

a fuel flow control valve regulating the fuel supply amount; and an exhaust gas flow control valve regulating the exhaust gas introduction amount, wherein the controller controls the fuel supply amount and the exhaust gas introduction amount through the fuel flow control valve and the exhaust gas flow control valve in accordance with the demanded hydrogen amount, the exhaust gas temperature and the air/fuel ratio.

4. An exhaust gas purification apparatus according to claim 1, wherein the controller is operative to control the fuel supply amount such that the fuel supply amount is decreased to a substantially minimum value with respect to the demanded hydrogen amount.

5. An exhaust gas purification apparatus according to claim 1, wherein the controller is operative to control an amount of the reformed gas generated by the reformer such that the amount of the reformed gas is decreased to a substantially minimum value with respect to the demanded hydrogen amount.

6. An exhaust gas purification apparatus according to claim 1, wherein a NOx trap catalyst device is provided to the exhaust system to have an operating property which traps NOx compounds contained in the exhaust gas during a lean condition of the air/fuel ratio of the exhaust gas and discharges trapped NOx compounds during a stoichiometry condition of the air/fuel ratio or during a rich condition of the air/fuel ratio, and wherein the reformed gas is supplied to an upstream of the NOx trap catalyst device.

7. An exhaust gas purification apparatus according to claim 6, wherein the controller estimates an amount of the NOx compounds trapped by the NOx trap catalyst device and calculates the demanded hydrogen amount in accordance with the amount of the NOx compounds trapped by the NOx trap catalyst device.

8. An exhaust gas purification apparatus according to claim 6, wherein the controller calculates the demanded hydrogen amount in accordance with a varying value of the amount of the NOx compounds trapped by the NOx trap catalyst device.

9. An exhaust gas purification apparatus according to claim 6, further comprising an accumulation device temporarily accumulating the reformed gas, wherein the controller estimates an amount of the hydrogen accumulated by the accumulation device and calculates the demanded hydrogen amount in accordance with the amount of the NOx compounds trapped by the NOx trap catalyst device and the amount of the hydrogen accumulated by the accumulation device.

10. An exhaust gas purification apparatus according to claim 6, wherein the controller estimates an amount of the hydrogen consumed by oxygen after supplying the reformed gas into the exhaust system and calculates the demanded hydrogen amount by adding the amount of the hydrogen consumed by the oxygen.

11. An exhaust gas purification apparatus according to claim 6, further comprising an accumulation device temporarily accumulating the reformed gas, wherein the controller estimates an amount of the reformed gas accumulated by the accumulation device and controls to supply the reformed gas to the upstream of the NOx trap catalyst device in accordance with the amount of the NOx compounds trapped by the NOx trap catalyst device and the amount of the reformed gas accumulated by the accumulation device.

12. An exhaust gas purification apparatus of an internal combustion engine, the internal combustion engine generating an exhaust gas to be introduced to an exhaust system thereof, comprising:

reforming means for reforming a fuel and the exhaust gas into a reformed gas containing at least hydrogen which is used for reducing NOx compounds contained in the exhaust gas by introducing the fuel and a part of the exhaust gas; and controlling means for controlling a fuel supply amount of the fuel introduced to the reforming means and an exhaust gas introduction amount of the exhaust gas introduced to the reforming means in accordance with a demanded hydrogen amount of the reforming means and an air/fuel ratio of the internal combustion engine, wherein the exhaust gas is purified while controlling the fuel supply amount and the exhaust gas introduction amount.

13. An exhaust gas purification method of an internal combustion engine, the internal combustion engine generating an exhaust gas to be introduced to an exhaust system thereof, comprising:

reforming a fuel and the exhaust gas into a reformed gas containing at least hydrogen which is used for reducing NOx compounds contained in the exhaust gas by introducing the fuel and a part of the exhaust gas; and controlling a fuel supply amount of the fuel introduced when the reformed gas is generated and an exhaust gas introduction amount of the exhaust gas introduced when the reformed gas is generated in accordance with a demanded hydrogen amount demanded when the reformed gas is generated and an air/fuel ratio of the internal combustion engine, wherein the exhaust gas is purified while controlling the fuel supply amount and the exhaust gas introduction amount.

* * * * *